United States Patent [19]

Prasad et al.

[11] 4,395,249
[45] Jul. 26, 1983

[54] VARIABLE SPEED DRIVE CLUTCH

[75] Inventors: Keni K. Prasad; Eugene G. Hayes, both of Beaver Dam, Wis.

[73] Assignee: Deere & Company, Moline, Ill.

[21] Appl. No.: 218,854

[22] Filed: Dec. 22, 1980

[51] Int. Cl.³ .............................................. F16H 55/52
[52] U.S. Cl. ........................................ 474/93; 474/198
[58] Field of Search .................................. 474/93, 198

[56] References Cited

U.S. PATENT DOCUMENTS

| | | | |
|---|---|---|---|
| 2,057,435 | 10/1936 | Kimble | 474/93 |
| 2,315,235 | 3/1943 | Weidner | 474/93 |
| 2,953,032 | 9/1960 | Ruess | 474/93 |
| 3,962,927 | 6/1976 | Beaudoin | 474/93 |
| 4,018,096 | 4/1977 | Foster | 474/93 |

Primary Examiner—Reinaldo P. Machado

[57] ABSTRACT

In a V-belt drive having a rotating pulley and an annular flange formed about the pulley axis and extending axially from a side of the pulley; a plurality of vanes extending from the radial outer surface of the flange; a plurality of air passages extending through the flange with each passage having an axis directed radially outwardly and toward the plane of said pulley, said passages being close to but in trailing relation to a vane.

7 Claims, 7 Drawing Figures

1

VARIABLE SPEED DRIVE CLUTCH

BACKGROUND OF THE INVENTION

This invention relates to a V-belt drive in which a pulley for the drive is designed so as to cause air generated by rotation of the pulley itself to operate to cool the V-belt as it leaves and enters the pulley. More specifically, the present invention relates to an improvement on a variable speed pulley of a centrifugal clutch type which is shown and described in a co-pending patent application, Ser. No. 122,594, filed Feb. 19, 1980 by Keni K. Prasad and now U.S. Pat. No. 4,313,728.

It is heretofore been known to provide annular flanges on the outer side of a variable speed pulley and to provide openings in that pulley so that air trapped inside the flange may move outwardly by mechanism which is internally of the flange. Such an arrangement is shown in U.S. Pat. No. 3,962,927, which issued to Guy Beaudoin and Marcel Vincent on June 15, 1976. Generally, such openings or air passages in the flange served only the purpose of having an opening through which air can exit. In the specific patent referred to, the device was used in the environment of a snowmobile and adjacent the engine of the snowmobile and consequently, the air exiting through these openings served the purpose of cooling the compartment in which the engine was mounted.

The life of a V-belt is generally inversely proportional to the temperature of the belt itself when it is in operation. A belt that generates a lot of heat and raises the internal temperature of the belt will normally have a considerable lower life expectancy than a belt which is kept at a comparatively low temperature. The temperature of a belt moving on a pulley of the type shown in the aforementioned U.S. Patent is not affected considerably due to the slightly lower temperature in the compartment. However, if a stream of air is moved directly against the belt, the temperature of the belt does drop considerably.

SUMMARY OF THE INVENTION

With the above in mind, it is the primary purpose of the present invention to provide an annular flange on a pulley which has openings or air passages through the flange that will redirect air moving through those openings axially inwardly toward the center plane of the pulley. When in operation, the belt will pass through the streams of air generated by the air passages as the belt enters and leaves the pulley. Such generation and impingement of the air directly against the belt will keep the belt at a substantially lower temperature than would occur if such impingement was not generated. Also, it is the object of the present invention to provide vanes that extend radially from the outer surface of the flange and which create a turbulence and vacuum adjacent the outer side of the air passages in the flange so that movement of air at a greater rate is generated through the respective passages. Therefore, the present invention serves not only to utilize passages in the flanges, as was done in the aforementioned patent, but also serves to redirect air toward the V-belt and at a greater velocity than was done by the structure of the invention shown in the aforementioned patent.

DESCRIPTION OF THE PREFERRED EMBODIMENT

Figure 1:
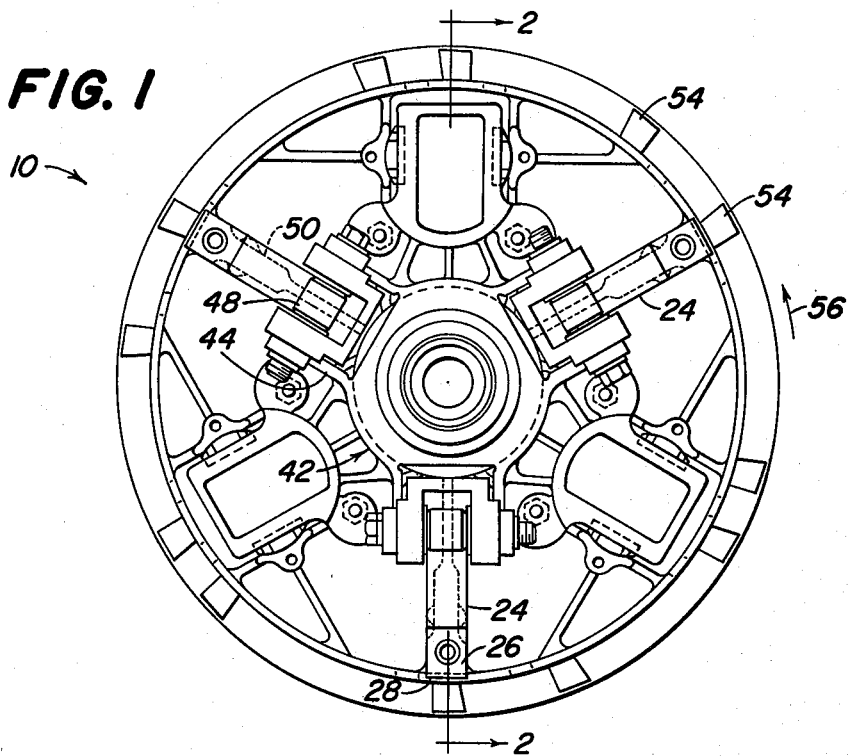
FIG. 1 is an end view of a clutch or variable speed pulley constructed in accordance with the present invention with a cover plate removed for clarity.
Figure 2:
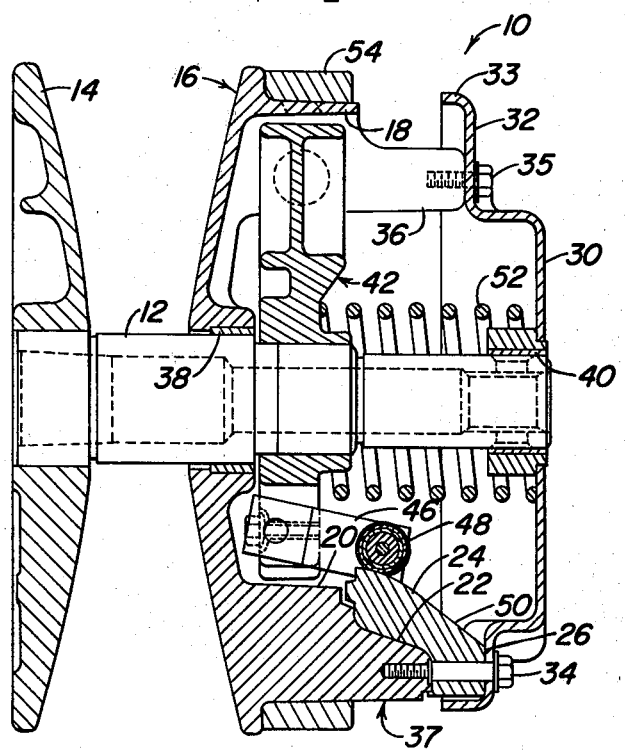
FIG. 2 is a longitudinal sectional view of the centrifugal clutch taken along line 2—2 of FIG. 1.

Referring now to the drawing, there is shown a variable speed pulley in the form of a centrifugal clutch indicated in its entirety by the reference numeral 10. The clutch 10 includes a drive shaft 12 having a first pulley or sheave half 14 fixed on one end thereof for rotation therewith. A second pulley or sheave half 16 is axially shiftable mounted on the shaft 12 beside the sheave half 14.

The sheave half 16 includes an annular rim or flange 18 which is fixed to the outer side of the sheave half 16 and extends axially away from that side. The sheave half 16 further includes three equiangularly-spaced support ribs 20 which extend radially relative to the shaft 12 and are joined to the rim 18. Each of the support ribs 20 is provided with a radially, outwardly extending stepped surface 22 facing axially away from the fixed sheave half 14. Seated against each of the surfaces 22 is a complementary-shaped ramp or cam element 24 having an outer end portion with a radially extending surface 26 and a contiguous, axially extending surface 28, the latter being substantially a continuation of the outer surface of the rim 18. A sheet metal cover 30 extends radially from the shaft 12 and includes a stepped end portion including a first section 32 positioned against the surface 26 of the ramp elements 24. A second section 33 is disposed adjacent the surface 28 of ramp elements 24. A plurality of fasteners 34 extend through respective sides of aligned holes in the cover 30, outer end portions of the ramp element 24 and into respective threaded holes in the ribs 20. Thus, the fasteners 34 act to sandwich the ramp or cam elements 24 between the cover 30 and the sheave half 16. Further fasteners 35 extend through the cover into further support ribs 36. The sheave half 16 and cover 30 cooperate to form a housing 37 which is supported on the shaft 12 via spaced bearings 38 and 40.

Located within the housing 37 and fixed to the shaft 12 is a spider 42 having six equiangularly-spaced support ears 44 on which roller arms 46 are respectively mounted. The angular disposition of the spider 42 is such that the ears 44 are in angular correspondence to the ramp or cam elements 24. The roller arms 46, respectively, support rollers 48 which engage axially and radially inclined surfaces 50 of the elements 24. A coil compression spring 52 is mounted on the shaft 12 within the housing 37 and is disposed to bias the cover 30 away from the spider 42 and, hence, to bias the sheave half 16 away from the sheave half 14.

It will be appreciated, then, that upon the shaft 12 being rotated faster and faster, the roller arms 46 will swing outwardly and the rollers 48 will act on the ramp elements 24 such as to urge the sheave half 16 toward the sheave half 14 and against the force of the spring 52. The same centrifugal forces which operate the roller arms 46 also operate on each and every component of the clutch 10. It has been found that the effects of such forces on the ramp elements are lessened to where the elements 24 and sandwiched between the cover 30 and the sheave half 16.

Figure 3:
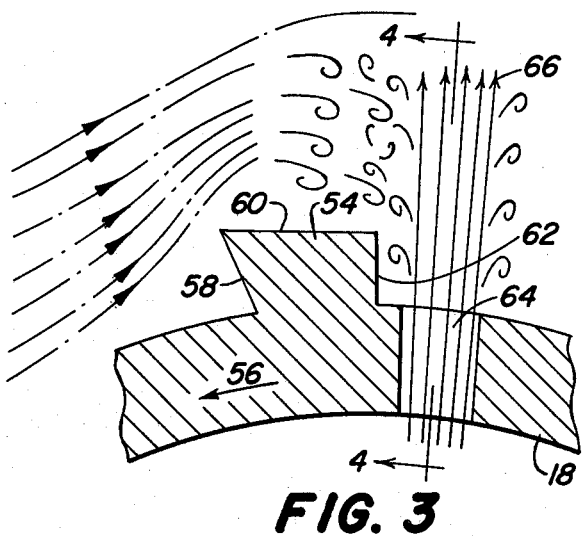
FIG. 3 is an enlarged sectional view, partially schematic, taken through an air passage in the flange of the pulley and in a plane normal to the pulley axis. The air turbulence is schematically shown and the direction of air movement is shown.

All of the above, with respect to the description of the variable width pulley, or clutch, are shown and described in substantially the same manner in the aforementioned patent application, Ser. No. 122,594. Referring now to the flange 18, there is provided, integrally with the flange, a series of vanes 54 that extend radially, outwardly from the flange 18. It will be noted that the side of the sheave half 16 extends radially beyond the flange 18 and the vanes 54 extend from the outer surface of the flange 18 to substantially the outermost edge of the sheave half 16. Through such an arrangement, the flange is disposed or spaced radially inwardly from the periphery of the pulley or sheave section 16. As shown in FIG. 1, the pulley will normally rotate in the direction of the arrow 56. Referring now to FIG. 3, each vane 54 has a leading surface 58 that is inclined from an innermost end to an outermost end, the latter being in advance of the inner end. Thus, the leading surface 58 is inclined in a forward direction with respect to the direction of travel. Each vane 54 also has an outer surface 60 that extends from the outermost end of the surface 58 in a trailing direction to a rearmost radial surface 62.

Figure 4:
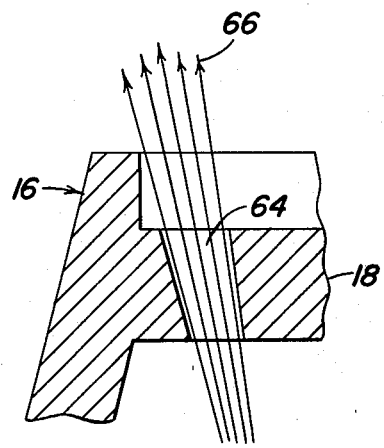
FIG. 4 is a view, also schematic, taken substantially along the line 4—4 of FIG. 3 and showing the direction of air moving through the air passage in the pulley flange.

Provided in the flange 18 are a series of air passages 64. With respect to the direction of rotation, the passages 64 are closely positioned and disposed in a trailing relation to the surface 62 of the respective vane 54. Reviewing FIG. 4, each air passage 64 has an axis that is itself inclined radially and the passage 64 is inclined radially outwardly and axially inwardly so that air, as shown at 66 in FIG. 4, moves through the passage and is directed toward the center plane of the pulley structure.

Again, referring to FIG. 3, it will be noted that upon the pulley rotating in the direction of the arrow 56, the air that is adjacent the surface of the flange 18 first contacts the surface 58 of the vane 54 where there is created a turbulent air flow just outwardly of the surface 60. This, in effect, creates a vacuum of air behind surface 62 and adjacent to the outlet of the passage 64 which, as a result, moves air through the passage 64. While the mechanism inward of the flange 18 does create some turbulence of air which would find its way through the opening 64, it is the purpose of the present invention to not only use the effect of the turbulence of the air created by the structure inwardly of the flange 18 but also to create a forced draft of air through the passage 64 by use of the vanes 54 so that the stream of air leaving the respective passage 64 increases its velocity as it moves through the inclined passages 64. Also, since air is drawn through the passages 64, it will also be drawn through the entire adjusting mechanism to thereby effect cooling of the mechanism.

Figure 5:
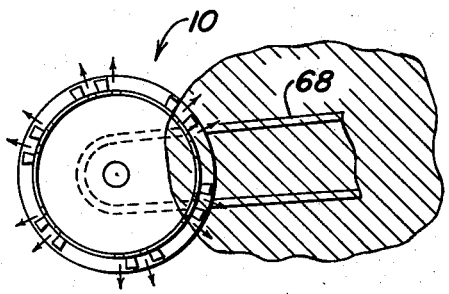
FIG. 5 is a schematic view showing the movement of air with respect to a pulley and V-belt driven by or on the pulley.

Referring now to FIG. 5, there is provided a V-belt 68 on the pulley structure or clutch 10. As is shown, the air moves radially outwardly and axially inwardly. Thus, as the belt enters and leaves the pulley, air is directed against the surfaces of the belt. This creates a cooling effect on the belt and, as mentioned previously, increases the life of the belt substantially. This is particularly important in a drive in which there is a variable speed pulley for the reason that there will tend, at times, to be more slippage which creates the high temperature in the belt.

Figure 6:
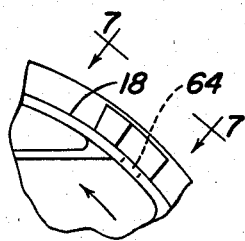
FIG. 6 is a view similar to FIG. 3, but showing a modified form of the invention.
Figure 7:
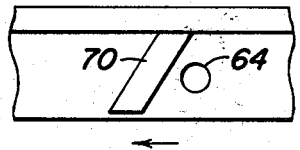
FIG. 7 is a view of the portion of the pulley shown in FIG. 3, as taken along the line 7—7 of FIG. 6.

Referring now to FIGS. 6 and 7, openings 64 are provided in the flanges 18. However, vanes 70 are inclined with respect to the direction of travel so that air moving through the passages 64 are redirected, if need be, toward the center plane of the pulley. While the air may be controlled by the angular disposition of the vanes 70, it has been found that such a vane is more difficult, from a practical standpoint, to be provided on the flange 18. Generally, the entire pulley or sheave half 16 is a cast member and it is difficult to remove a sheave half from the mold when the vanes 70 are so inclined or directed. Thus, while the vanes 70 may be designed to redirect air moving through a passager 64, the preferred embodiment, as shown in FIGS. 1–5, has some advantages from a practical standpoint.

We claim:

1. In a V-belt drive having a rotating pulley and an annular flange closely adjacent the pulley periphery formed about the pulley axis and extending axially from a side of the pulley; a plurality of vanes extending radially from the radial outer surface of the flange; said flange having means including air passages extending through the flange for directing air outwardly and toward the center plane of the pulley, said passages being close to but in trailing relation with respect to respective vanes extending from the flange.

2. The invention defined in claim 1 in which the vanes are inclined with respect to the direction of travel to effect movement of air moving through the passages toward the center plane of the pulley.

3. The invention defined in claim 1 in which the passages extend radially outwardly and axially inwardly through the flange.

4. In a V-belt drive having a rotating pulley, mechanism alongside and rotatable with the pulley for effecting radial movement of air; an annular flange closely adjacent the pulley's periphery and rotatable with and extending from the side of the pulley and positioned to block a portion of the radially moving air, said flange having means including air passages therein permitting a portion of the air to move through the flange and directing said portions of air to move toward the center plane of said pulley; and a plurality of vanes extending radially from the radial outer surface of the flange.

5. The invention defined in claim 4 characterized by the air passages extending radially outwardly and axially inwardly to be effective as the means for redirecting a portion of the air toward the center plane of said pulley.

6. In a V-belt drive having a rotating variable speed pulley, mechanism alongside and rotatable with the pulley for effecting opening and closing of the pulley and effecting radial movement of air; an annular flange rotatable with and extending from a side of the pulley and positioned to block a portion of the radially moving air, said flange having air passages therein for redirecting a portion of the moving air through the flange and toward the center plane of said pulley; and vanes outwardly of the flange drawing air through the passages and across said mechanism for cooling the latter and a V-belt as it enters and leaves the pulley.

7. In a V-belt drive having a rotating pulley and an angular flange formed about the pulley axis and extending outwardly from a side of the pulley; a plurality of radially, outwardly and axially inwardly directed air passages extending through the flange; and vanes extending outwardly from the outer surface of the flange for generating movement of air through the passages, said vanes being close to and in advance of the passages, and said vanes having leading surfaces that are inclined from an inner radial end to an outermost radial end that is in advance of the inner end.

* * * * *